(12) United States Patent
McKendry et al.

(10) Patent No.: US 7,172,086 B2
(45) Date of Patent: Feb. 6, 2007

(54) VENTED AND DOUBLE WALLED BABY BOTTLES

(75) Inventors: Bruce McKendry, Benecia, CA (US); Sung Lee, Sacramento, CA (US)

(73) Assignee: L. Jason Clute, Alamo, CA (US)

( * ) Notice: Subject to any disclaimer, the term of this patent is extended or adjusted under 35 U.S.C. 154(b) by 23 days.

(21) Appl. No.: 11/120,281

(22) Filed: May 2, 2005

(65) Prior Publication Data

US 2006/0243694 A1 Nov. 2, 2006

(51) Int. Cl.
*A61J 11/02* (2006.01)
*A61J 9/04* (2006.01)
*A61J 9/08* (2006.01)

(52) U.S. Cl. ............ 215/11.5; 215/11.1; 215/11.6; 215/12.1; 215/902; 220/592.15; 220/592.17

(58) Field of Classification Search ............ 215/10, 215/11.5, 11.6, 248, 902, 11.1, 12.1, 2; 220/592.15, 220/592.17, 592.23
See application file for complete search history.

(56) References Cited

U.S. PATENT DOCUMENTS

| | | | | |
|---|---|---|---|---|
| 1,221,335 A | * | 4/1917 | Kline | ............ 215/13.1 |
| 1,434,460 A | * | 11/1922 | Tibbatts | ............ 220/4.26 |
| 1,589,138 A | | 6/1926 | Fisk | |
| 1,706,034 A | * | 3/1929 | Moore | ............ 215/11.6 |
| 2,096,961 A | | 10/1937 | Condon | |
| 2,191,447 A | * | 2/1940 | Beardsley | ............ 215/248 |
| 2,575,283 A | | 11/1951 | Menrath | |
| 2,744,646 A | * | 5/1956 | Blackstone | ............ 215/11.1 |
| 2,864,520 A | | 12/1958 | Pitavy | |
| 3,075,666 A | | 1/1963 | Hoffstein | ............ 215/11.3 |
| 3,311,248 A | | 3/1967 | Marchant | |
| 3,312,262 A | | 4/1967 | Hunter | |
| 3,871,543 A | | 3/1975 | Chadfield et al. | |
| 4,078,686 A | | 3/1978 | Karesh | |
| 4,098,434 A | * | 7/1978 | Uhlig | ............ 222/94 |
| 4,121,525 A | * | 10/1978 | Courtis | ............ 111/200 |
| 4,215,785 A | | 8/1980 | Schwaiger | |

(Continued)

FOREIGN PATENT DOCUMENTS

DE 1 753 146 7/1971

(Continued)

OTHER PUBLICATIONS

NALGENE GoCup™; webmaster@nalgenunc.com; 2004.

*Primary Examiner*—Sue A. Weaver
(74) *Attorney, Agent, or Firm*—Greer, Burns & Crain, Ltd.

(57) ABSTRACT

A container has an inner vessel for containing liquid such as milk, water, juice or the like. An outer vessel creates a larger volume than the volume of the inner vessel, so that the inner vessel can fit inside the outer vessel. A top cap secures the inner and outer vessels in spaced relation to each other. The top cap can have an integral nipple in fluid communication with the inside of the inner vessel. In another embodiment, a vent in a top cap permits air to enter a liquid holding vessel as the liquid is removed. A filter in the vent allows the air to pass, but not the liquid, so the liquid does not spill when the container is tipped.

11 Claims, 10 Drawing Sheets

U.S. PATENT DOCUMENTS

| | | | |
|---|---|---|---|
| 4,238,040 A | 12/1980 | Fitzpatrick | 215/11.3 |
| 4,301,799 A * | 11/1981 | Pope et al. | 604/405 |
| 4,429,798 A | 2/1984 | Borows | |
| 4,776,972 A * | 10/1988 | Barrett | 252/186.38 |
| 4,850,496 A * | 7/1989 | Rudell et al. | 215/12.1 |
| 4,865,207 A | 9/1989 | Joyner et al. | 215/11.5 |
| 4,982,769 A * | 1/1991 | Fournier et al. | 141/98 |
| 5,029,701 A | 7/1991 | Roth et al. | |
| 5,099,998 A | 3/1992 | Curzon et al. | |
| 5,419,445 A | 5/1995 | Kaesemeyer | 215/11.1 |
| 5,499,729 A | 3/1996 | Greenwood et al. | |
| 5,570,796 A | 11/1996 | Brown et al. | 215/11.5 |
| 5,579,935 A | 12/1996 | Atkin et al. | 215/11.1 |
| 5,678,710 A | 10/1997 | Sheu | 215/11.5 |
| 5,747,083 A | 5/1998 | Raymond et al. | 426/117 |
| 5,779,071 A | 7/1998 | Brown et al. | D24/197 |
| 5,921,426 A | 7/1999 | Randolph | 220/495.06 |
| 6,003,698 A | 12/1999 | Morano | 215/11.1 |
| D420,448 S | 2/2000 | Brown et al. | 215/11.5 |
| 6,032,810 A | 3/2000 | Meyers et al. | 215/11.1 |
| 6,053,342 A | 4/2000 | Chomik | 215/11.5 |
| 6,253,935 B1 | 7/2001 | Fletcher | 215/11.5 |
| 6,446,822 B1 | 9/2002 | Meyers et al. | 215/11.5 |
| 6,616,000 B1 | 9/2003 | Renz | |
| 6,631,819 B1 | 10/2003 | Diak Ghanem | |
| 6,884,229 B2 | 4/2005 | Renz | |
| 6,971,551 B2 * | 12/2005 | Widgery | 222/129 |
| 7,004,339 B2 | 2/2006 | Renz | |
| 2003/0000907 A1 | 1/2003 | Kevorkian et al. | 215/11.5 |
| 2003/0004459 A1 * | 1/2003 | McKendry et al. | 604/74 |
| 2003/0085193 A1 | 5/2003 | Hsu | 215/11.1 |
| 2003/0160019 A1 | 8/2003 | Blanding | |
| 2004/0118801 A1 | 6/2004 | Brown et al. | 215/11.1 |
| 2005/0056610 A1 | 3/2005 | Randolph et al. | 215/11.1 |

FOREIGN PATENT DOCUMENTS

| | | |
|---|---|---|
| DE | 44 16 685 | 11/1995 |
| EP | 0 345 694 | 12/1989 |
| FR | 1102993 | 10/1955 |
| GB | 1152037 | 5/1969 |
| GB | 1248226 | 9/1971 |

* cited by examiner

VENTED AND DOUBLE WALLED BABY BOTTLES

FIELD OF THE INVENTION

This invention relates to containers, and more particularly, to double walled baby bottles, and vented baby bottles.

BACKGROUND OF THE INVENTION

Conventional baby bottles have a single wall that does not retain heat well. Insulated baby bottles increase heat retention by using a double-walled container, but there is a need for improved double walled baby bottles.

Some baby bottles are vented, to allow air from the atmosphere into the bottle as milk is taken out. However, conventional vented baby bottles often spill some of the milk out through the vent when the bottle is turned upside down from an upright position. Thus, there is also a need for vented baby bottles that do not drip or spill milk from the bottle when the bottle is tipped upside down.

Accordingly, one object of this invention is to provide new and improved containers.

Another object is to provide new and improved double walled baby bottles.

Another object is to provide new and improved vented baby bottles.

SUMMARY OF THE INVENTION

In keeping with one aspect of this invention, a container has an inner vessel for containing liquid such as milk, water, juice or the like. An outer vessel creates a larger volume than the volume of the inner vessel, so that the inner vessel can fit inside the outer vessel.

The inner vessel has an open top end, and the outer vessel has an open top end. A top cap covers both vessels, and is secured so as to maintain the inner and outer vessels in spaced relation to each other. The top cap can have an integral nipple in fluid communication with the inside of the inner vessel. An alternate top cap secures the inner and outer vessels in the same manner, without the integral nipple. Either top cap can be used with the outer vessel alone, or the inner vessel alone, as well as the double-walled assembly of vessels.

A bottom cap can also be provided for the bottom end of the inner vessel, if desired. The bottom end of the inner vessel can be sized to industry standard diameter and threads, to accommodate conventional baby bottle caps and nipples.

In another aspect of the invention, a vent in the top cap permits air to enter the liquid holding vessel as the liquid is removed. A filter in the vent allows the air to pass, but not the liquid, so the liquid does not spill when the container is tipped.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
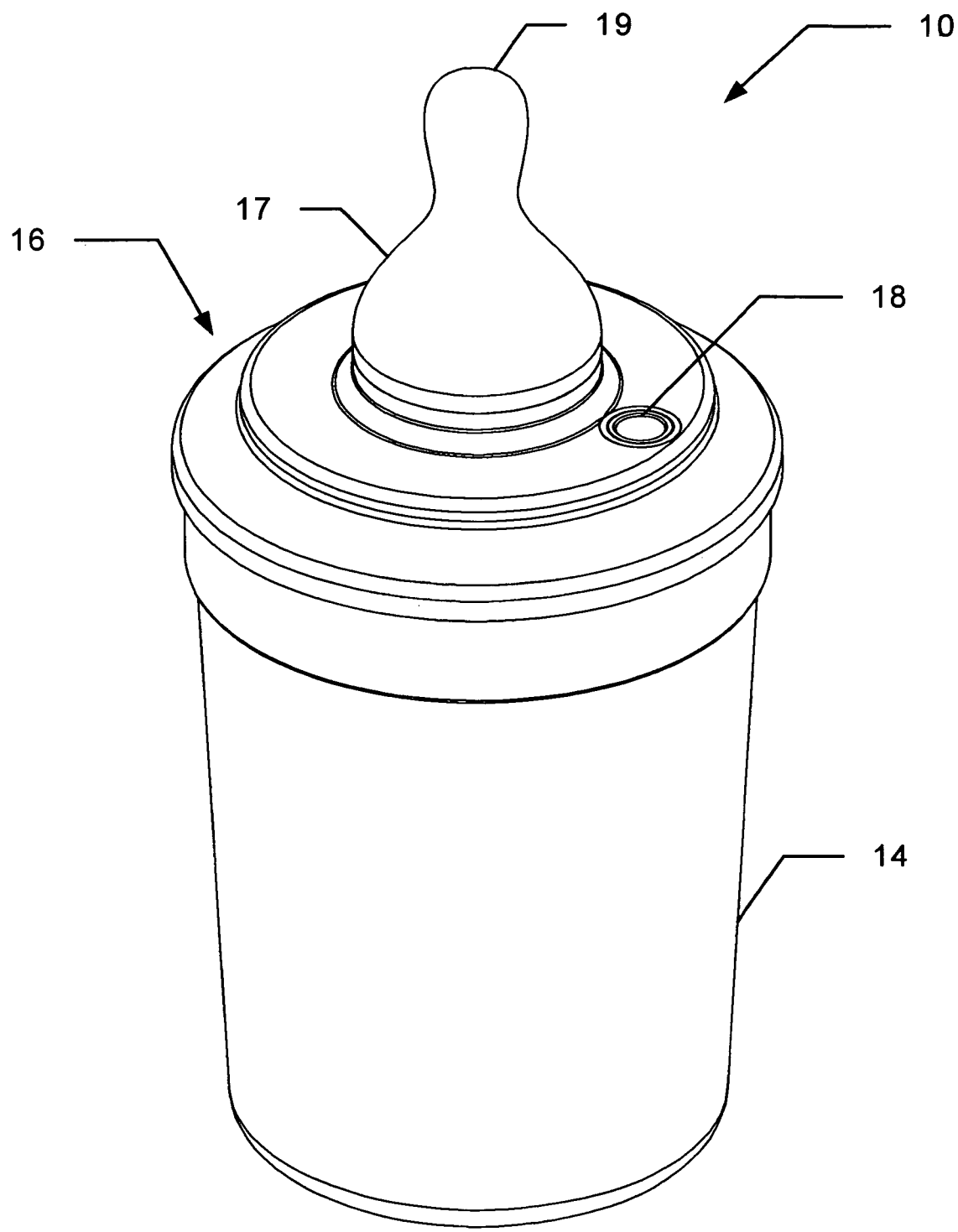
FIG. 1 is a perspective view of a container made in accordance with the present invention.
Figure 2:
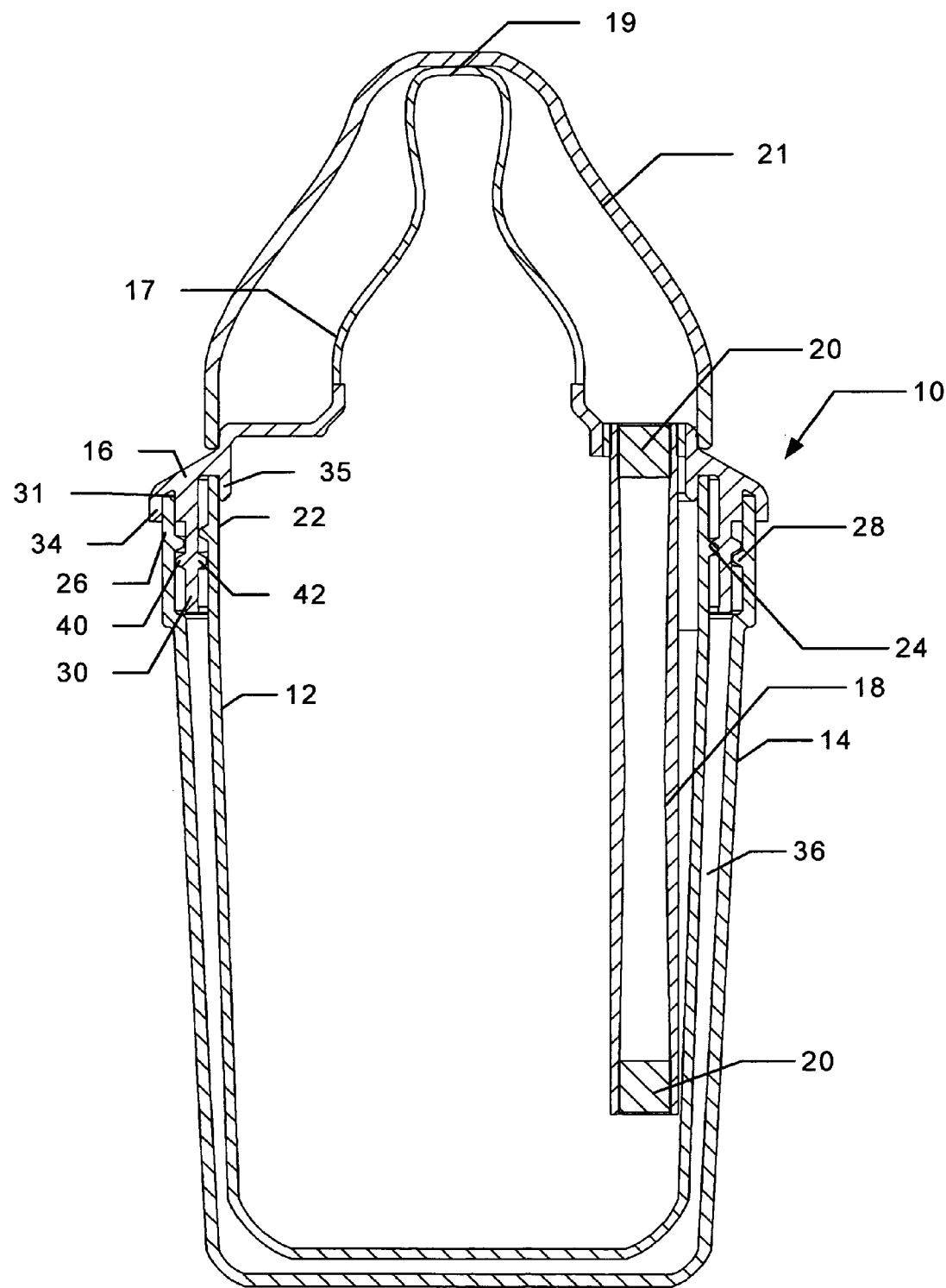
FIG. 2 is a cross-sectional view of the container of FIG. 1.
Figure 3:
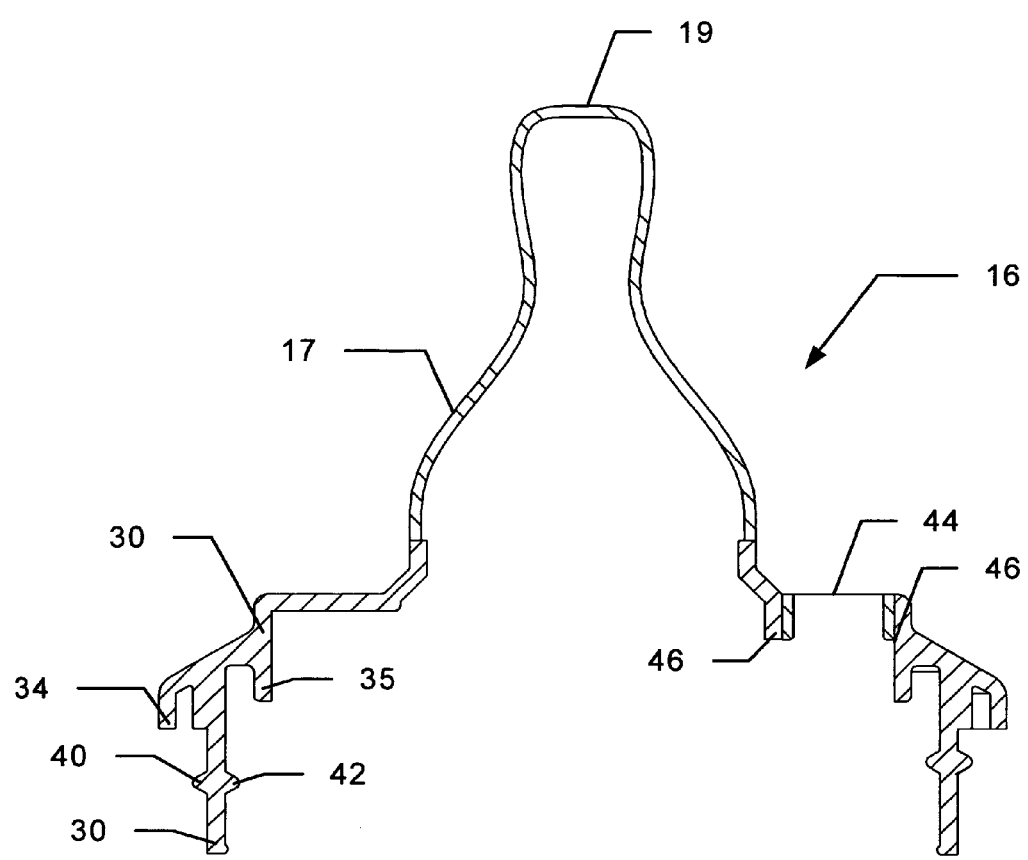
FIG. 3 is a cross-sectional view of a top cap used in the container of FIG. 2.

As seen in FIGS. 1 and 2, a baby bottle 10 has an inner vessel 12, an outer vessel 14, a top cap 16 having a nipple 17, and a vent 18. The nipple 17, which could also be a spout for sipping or the like, has an opening 19 for controlled release of liquid contained in the inner vessel. The vent 18 includes at least one filter 20.

The vessels 12 and 14 can contain liquid such as milk, juice or water for a baby. A removable sanitary cap 21 can be provided to protect the nipple 17 and bottle contents from outside contamination.

As seen in FIG. 2, the outer vessel 14 creates a larger volume than the volume of the inner vessel 12, so that the inner vessel 12 can fit inside the outer vessel 14. The inner vessel 12 has an open top end 22 and at least one thread 24 surrounding the outside of the top end 22. The outer vessel 14 has an open top end 26 and can have at least one thread 28 inside the top end 26.

The top cap 16 secures and seals the inner and outer vessels in spaced relation to each other, as seen in FIG. 2, although the top cap 16 could be used with either vessel 12 or vessel 14 alone. The cap 16 (FIG. 2) has a first portion 30 that fits between the inner and outer vessels below a top edge 31 of the outer vessel 14, and extends over the open end of the vessel 12 to the nipple 17, which is preferably integral with the first portion 30. The first portion 30 and nipple 17 can be made in an integral manner by co-molding, chemical bonding, welding, or suitable mechanical attachment. The first portion 30 can be made of a material such as polypropylene, and the nipple 17 can be made of a different material such as thermal plastic elastomer (TPE).

The cap 16 has lips 34, 35 that further seal a space 36 between the inner and outer vessels. The space 36 provides thermal insulation for the inner vessel 12, and can itself contain air, heated water, cooled water or the like.

The cap 16 also has at least one thread 40 that engages the thread 28 on the outer vessel 14, and at least one thread 42 which engages the thread 24 of the inner vessel 12. The cap 16 could also secure the vessels 12, 14 in other ways, such as press fit, bayonet attachment, or bonding. Bonding is advantageous for single use applications, for disposable containers, and for preserving the contents in a sterile or uncontaminated condition. In these and other suitable ways, the vessels can be secured in spaced relation to each other, and the space 36 can be adequately sealed.

Figure 4:
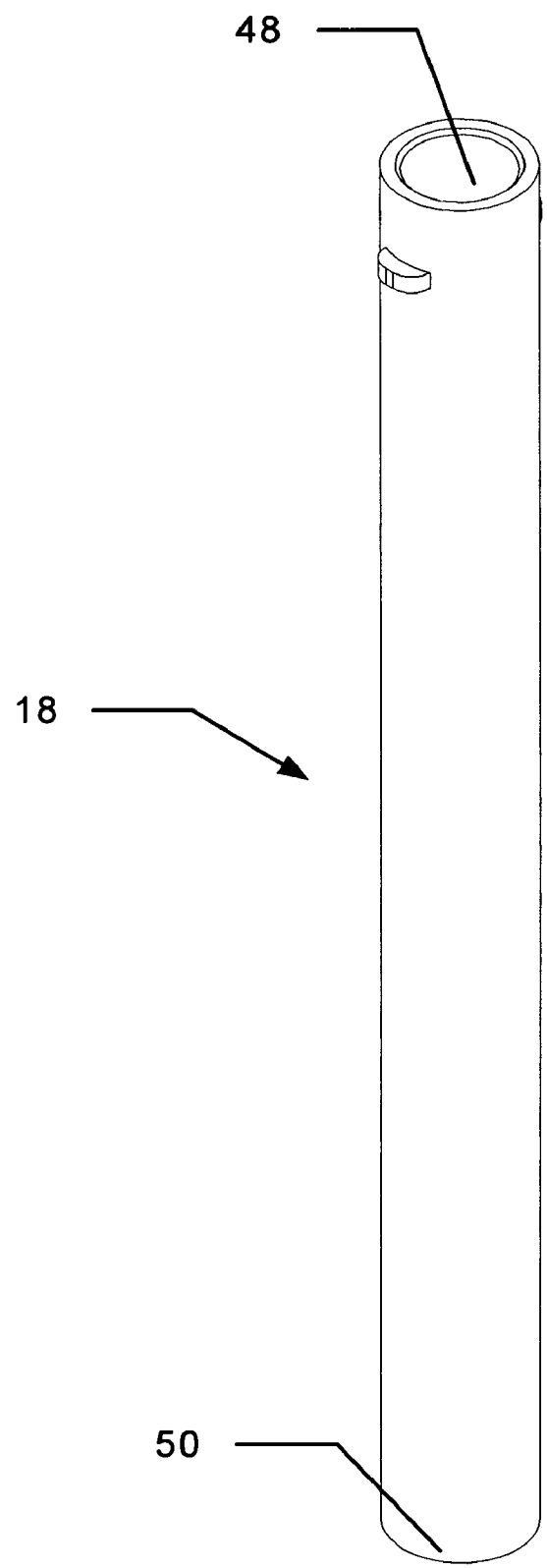
FIG. 4 is a perspective view of a vent used in the container of FIG. 2.
Figure 5:
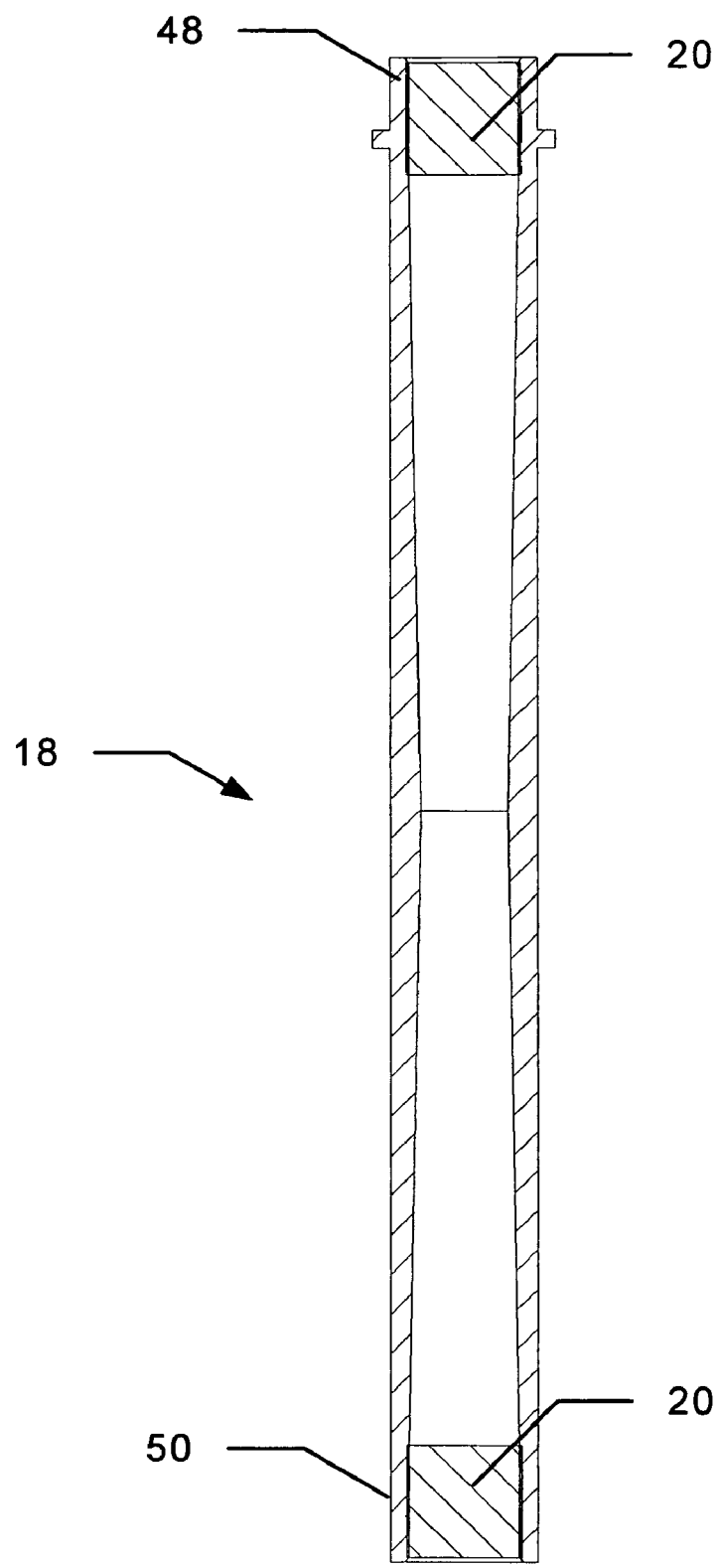
FIG. 5 is a cross-sectional view of the vent of FIG. 4.

The top cap 16 further includes an opening 44 and spaced inner extensions 46, which receive and secure the vent 18, shown in FIGS. 4 and 5. The vent 18 is an elongated tube having a first end 48 secured to the cap 16, and a second end 50 that opens inside the inner container 12. The first end 48 can be press fit between the extensions 46, or it can be fixed in the cap 16 by molding or the like.

Figure 6:
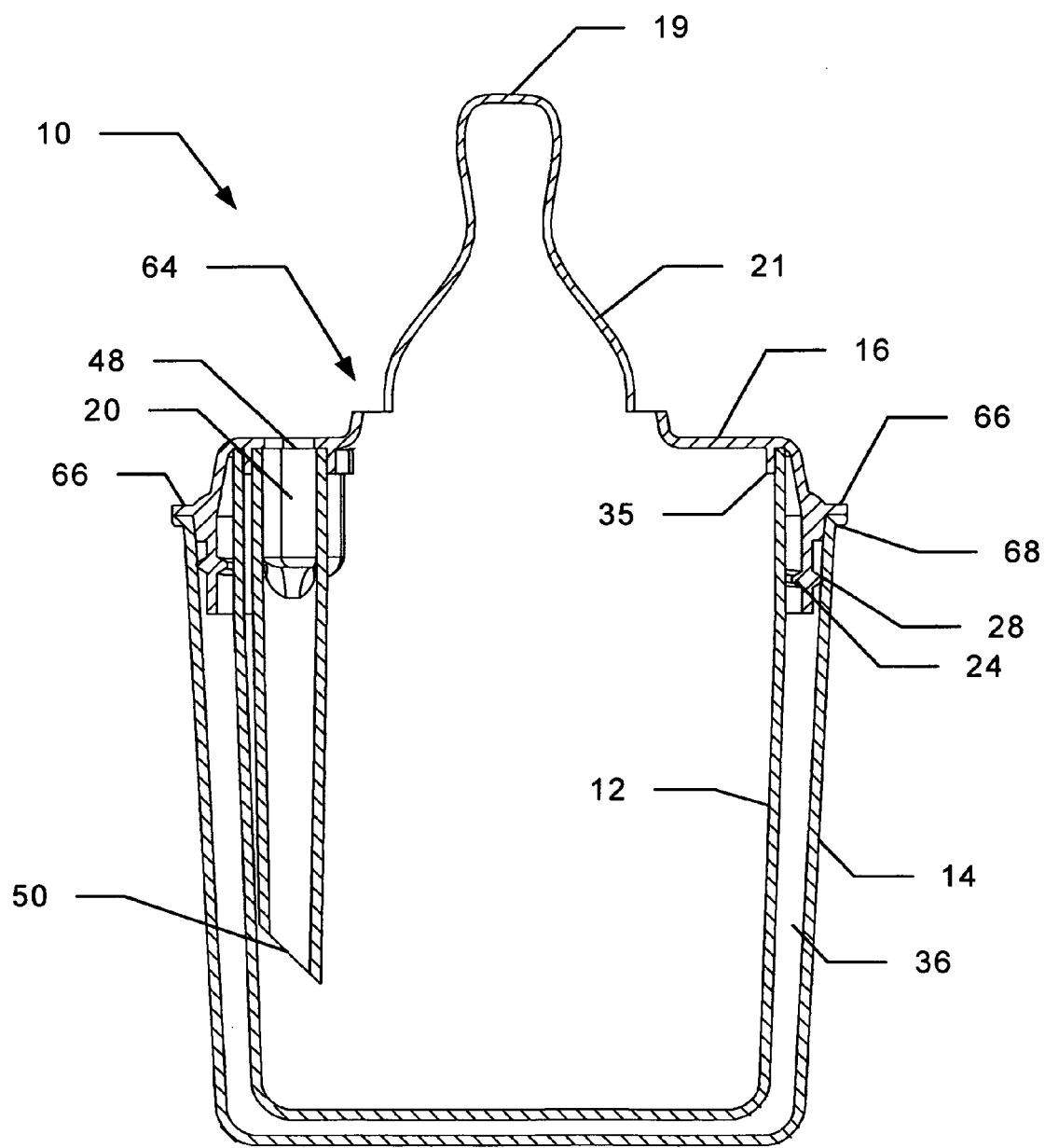
FIG. 6 is a cross-sectional view of an alternate embodiment of a container made in accordance with the present invention.

The filter 20 is located at the first end 48 in FIG. 6, but the filter 20 could also be located in the second end 50, if desired. Multiple filters 20 can be used, too, as in FIG. 2. The filter 20 is substantially impermeable to liquid but substantially permeable to air, whether wet or dry. Suitable filters include the Versapor R filter made by Pall Filter Corp., and similar filters made by Porex.

A variation of the cap 16 is shown in FIG. 6. In FIG. 6, a top cap 64 secures the vessel 14 in spaced relation to the vessel 12 in generally the same manner as the cap 16. Instead of the lip 34, though, the top cap 64 has a finger 66 that extends over a top edge 68 of the outer vessel 14, to better seal the space 36.

Figure 7:
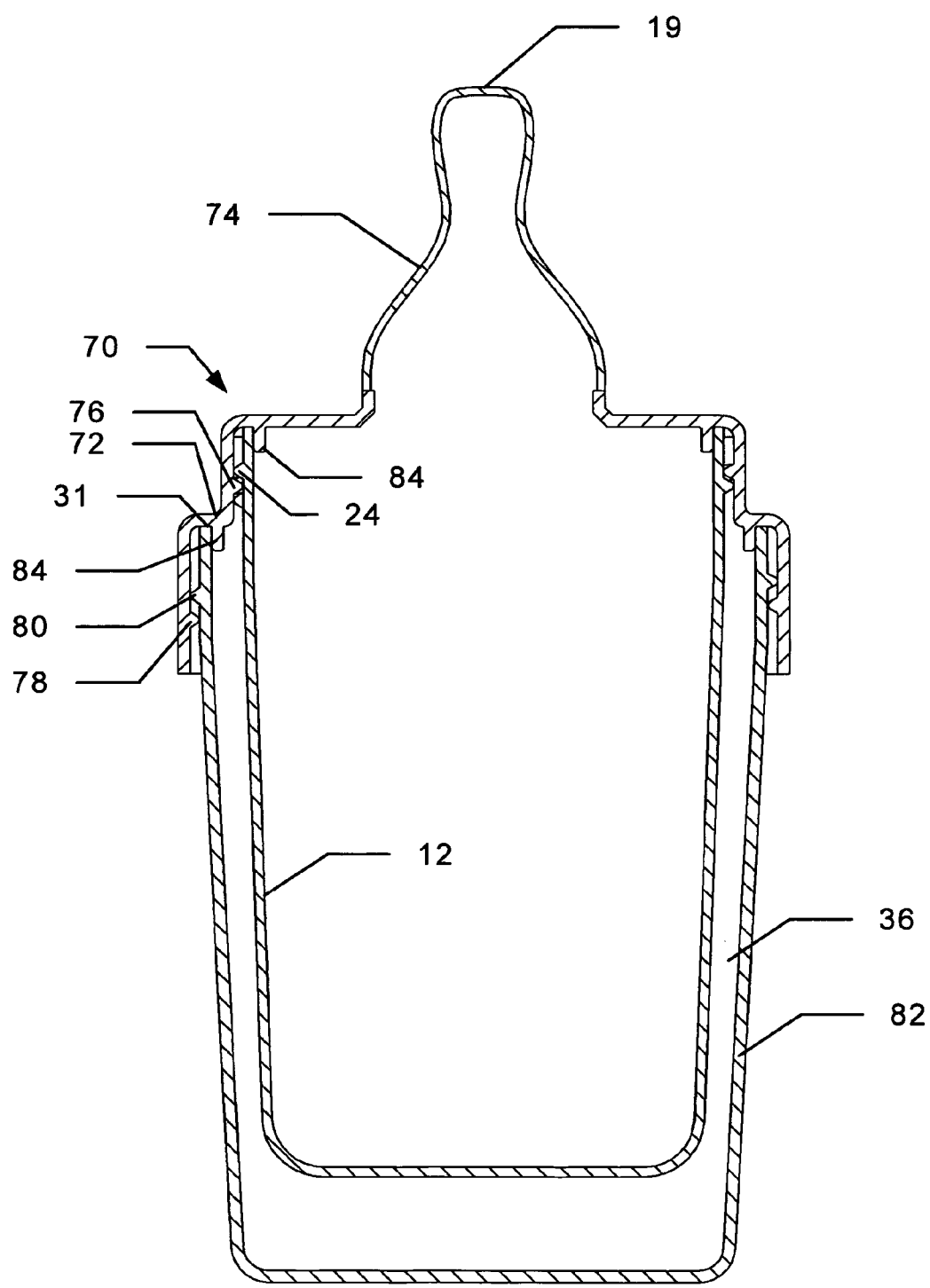
FIG. 7 is a cross-sectional view of another alternate embodiment of a container made in accordance with the present invention.

Another variation of the cap 16 is shown in FIG. 7. In FIG. 7, a top cap 70 has a first portion 72 and an integral nipple 74. The first portion 72 has at least one thread 76 which engages the thread 24 on the inner vessel 12. At least one thread 78 engages a thread 80 on the outside of an outer vessel 82. Lips 84 better secure the cap 70 to the vessels 12, 82, and better seal the vessels 12, 82. Like the cap 16, the top cap 70 spaces the inner and outer vessels in relation to each other to create the space 36, but the first portion 72 extends between the vessels 12, 82 above the edge 31. The threads secure the cap to the vessels, and the first portion 72 and nipple 74 seal the top open ends of the vessels.

Figure 8:
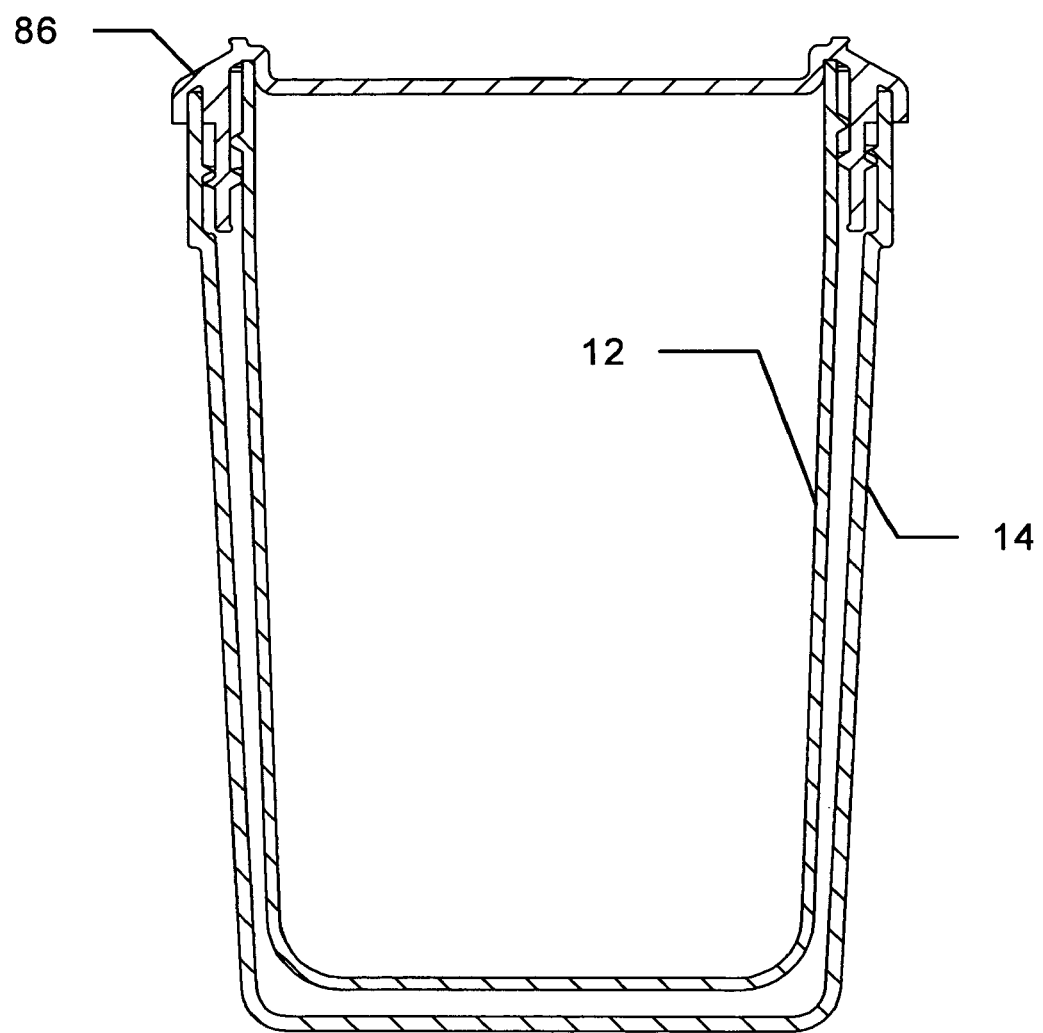
FIG. 8 is a cross-sectional view of the container of FIG. 2, with a top cap for storage.

FIG. 8 illustrates a storage cap 86 that is similar to any of the other top caps just described, but does not have a nipple or a vent. The cap 86 can store liquid in the inner vessel 12 and the outer vessel 14 in the double walled configuration discussed, the outer vessel 14 alone, or the inner vessel 12 alone.

Figure 9:
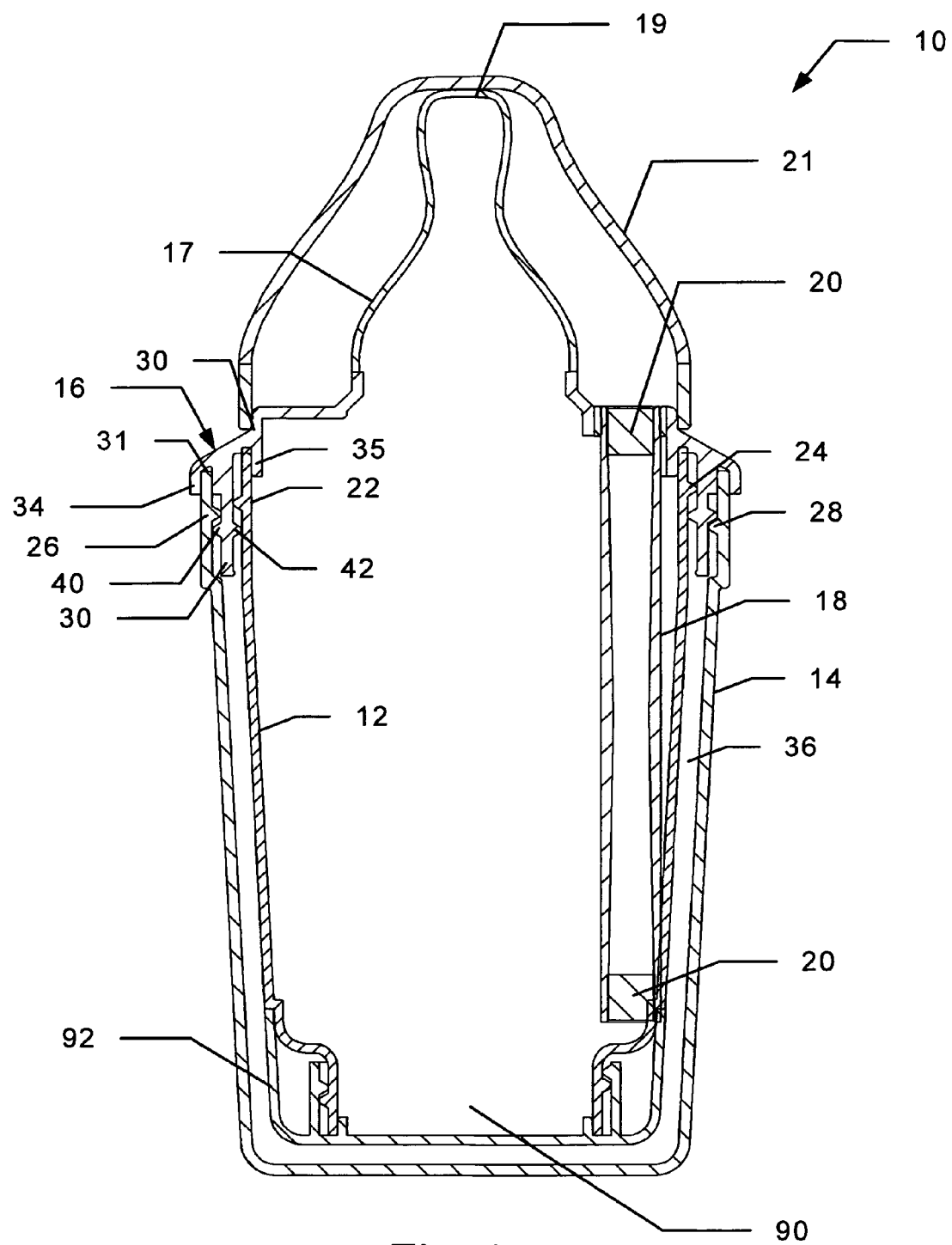
FIG. 9 is a cross-sectional view of the container of FIG. 1, with a bottom cap.

It is contemplated that the top ends of the inner and outer vessels will not accept an industry standard nipple and cap. It is desirable to at least have the capability to use an industry standard nipple and cap, though, and a bottom opening 90 may be provided for this purpose, if desired, as shown in FIG. 9. A bottom cap 92 seals the opening 90 when the opening 90 is not used.

Figure 10:
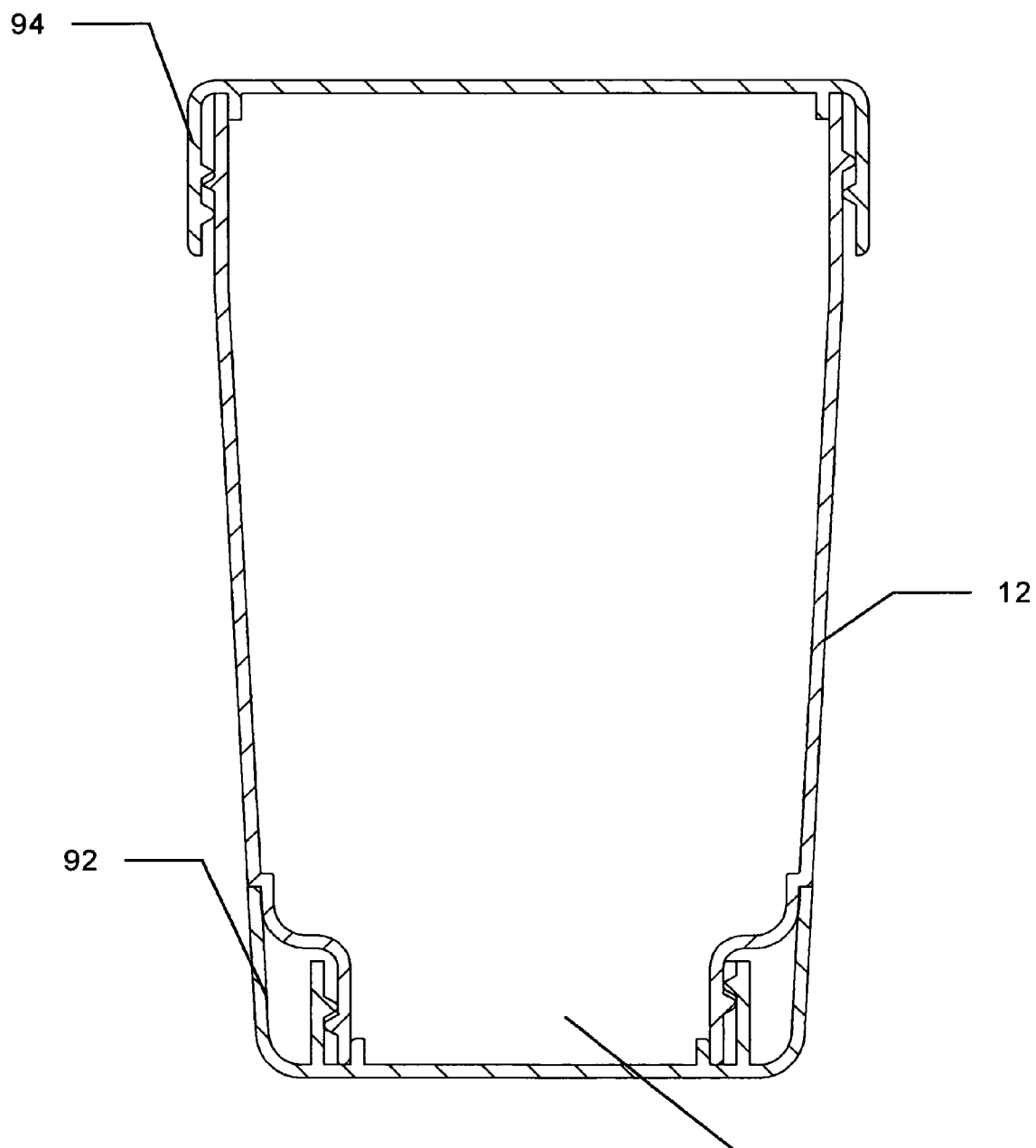
FIG. 10 is a cross-sectional view of the inner vessel of the container of FIG. 9, with a bottom cap and storage cap on the top.

To facilitate use of a standard nipple and cap of the bottom opening 90, the storage cap 86 (FIG. 8) or a storage cap 94 (FIG. 10) is needed. The top cap 94 only seals the inner vessel 12.

Liquid (or solid food) can easily be stored in the vessel 12 with both caps 92 and 94. An industry standard or other sized cap and nipple can be used by replacing the cap 92 with an industry standard (or the like) cap and nipple, or a cap of the present invention can be used, but replacing the top 94 with a cap of the present invention.

While the principles of the invention have been described above in connection with specific apparatus and applications, it is to be understood that this description is made only by way of example and not as a limitation on the scope of the invention.

What is claimed is:

1. A baby bottle for containing and releasing nourishing liquid such as milk, water, juice and the like comprising:
    an inner vessel for containing the liquid, the inner vessel having an open top end;
    an outer vessel that creates a larger volume than the volume of the inner vessel, so that the inner vessel can fit inside the outer vessel, the outer vessel also having an open top end; and
    a top cap that spaces the inner and outer vessels in relation to each other and can cover the open top ends of the inner and outer vessels, the top cap having a first portion that extends between the top ends of the inner and outer vessels,
    wherein the top cap has an opening in fluid communication with the inside of the inner vessel for controlled release of liquid contained in the inner vessel, and
    the opening is in an integral nipple in the top cap;
    wherein the first portion is made of a first weldable material, and the nipple is made of a second material different from the first weldable material,
    the first portion having means for securing the cap to the inner and outer vessels; and means for sealing the open top ends of the inner and outer vessels;
    a vent in the top cap, the vent permitting atmospheric air to enter the inner vessel as liquid is removed from the inner vessel,
    wherein the vent is an elongated tube having a first end secured to the top cap, and a second end that opens inside the inner vessel; and
    a filter in the vent;
    wherein the filter is substantially permeable to air, and substantially impermeable to liquid, whether wet or dry, so liquid does not spill through the vent when the baby bottle is tipped.

2. The baby bottle of claim 1, wherein the first portion extends below a top edge of the top end of the outer vessel.

3. The baby bottle of claim 1, wherein the first portion extends above a top edge of the outer vessel.

4. The baby bottle of claim 1, wherein the securing means has at least one thread surrounding the outside of the top end of the inner vessel, and at least one thread inside the top end of the outer vessel, the first portion of the top cap having threads sufficient to engage the thread of the inner vessel and the thread of the outer vessel.

5. The baby bottle of claim 1, wherein the securing means has at least one thread outside of the top end of the inner vessel, and at least one thread outside of the top end of the outer vessel, the first portion of the top cap having threads sufficient to engage the thread of the inner vessel and the thread of the outer vessel.

6. The baby bottle of claim 1, wherein the means for sealing includes the first portion of the top cap and at least one lip protruding from the first portion.

7. The baby bottle of claim 1, wherein the filter is located in the first end of the tube.

8. The baby bottle of claim 1, wherein the filter is located in the second end of the tube.

9. The baby bottle of claim 1, wherein the inner vessel has an open bottom, the inner vessel having a bottom cap that seals the open bottom.

10. A baby bottle for containing and releasing nourishing liquid such as milk, water, juice and the like, comprising:
    at least one vessel for containing the liquid, the vessel having an open top end,
    a top cap having a first portion that substantially seals the open top end of the vessel, wherein the top cap has an opening in fluid communication with the inside of the vessel, for controlled release of liquid contained in the inner vessel,
    the opening being in an integrals nipple in the top cap;
    wherein the first portion is made of a first weldable material, and the nipple is made of a second material different from the first weldable material, a vent in the top cap, the vent permitting atmospheric air to enter the vessel as liquid is removed from the vessel, wherein the vent is an elongated tube having a first end secured to the top cap, and a second end that opens inside the vessel; and a filter in the vent, the filter being substantially permeable to air, and substantially impermeable to liquid when wet or dry, so liquid does not spill through the vent when the baby bottle is tipped.

11. The baby bottle of claim 10, wherein the vessel has an open bottom end, the baby bottle further comprising a bottom cap that seals the bottom of the vessel.

* * * * *

UNITED STATES PATENT AND TRADEMARK OFFICE
CERTIFICATE OF CORRECTION

PATENT NO. : 7,172,086 B2 Page 1 of 1
APPLICATION NO. : 11/120281
DATED : February 6, 2007
INVENTOR(S) : Bruce McKendry et al.

It is certified that error appears in the above-identified patent and that said Letters Patent is hereby corrected as shown below:

In the Claims:

Col. 4, line 63, delete "inner"

Signed and Sealed this

Eighth Day of May, 2007

JON W. DUDAS
*Director of the United States Patent and Trademark Office*